(12) United States Patent
Liu et al.

(10) Patent No.: US 12,262,236 B2
(45) Date of Patent: Mar. 25, 2025

(54) INFORMATION CONFIGURATION METHOD, NETWORK APPARATUS, AND TERMINAL

(71) Applicant: GUANGDONG OPPO MOBILE TELECOMMUNICATIONS CORP., LTD., Guangdong (CN)

(72) Inventors: Jianhua Liu, Dongguan (CN); Haorui Yang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 563 days.

(21) Appl. No.: 17/564,118

(22) Filed: Dec. 28, 2021

(65) Prior Publication Data
US 2022/0124539 A1   Apr. 21, 2022

Related U.S. Application Data

(63) Continuation of application No. PCT/CN2019/099956, filed on Aug. 9, 2019.

(51) Int. Cl.
   *H04W 24/10*   (2009.01)
   *H04M 11/00*   (2006.01)
   (Continued)

(52) U.S. Cl.
   CPC ........... *H04W 24/10* (2013.01); *H04W 76/23* (2018.02)

(58) Field of Classification Search
   CPC .. H04L 41/0894; H04L 41/082; H04W 24/10; H04W 28/0925; H04M 15/66; H04M 41/0894
   (Continued)

(56) References Cited

U.S. PATENT DOCUMENTS

2011/0098043 A1   4/2011   Yu
2014/0120907 A1   5/2014   Yu et al.
(Continued)

FOREIGN PATENT DOCUMENTS

CN   103533524 A   1/2014
CN   105992184 A   10/2016
(Continued)

OTHER PUBLICATIONS

Supplementary European Search Report in the European application No. 19940986.3, mailed on Aug. 22, 2022.
(Continued)

*Primary Examiner* — Marcus Smith
*Assistant Examiner* — Jason A Harley
(74) *Attorney, Agent, or Firm* — Ladas & Parry, LLP

(57) ABSTRACT

An information configuration method, a network apparatus, a terminal, a chip, a computer readable storage medium, a computer program product and a computer program are provided. The method includes: receiving a usage information reporting configuration sent by a network apparatus, wherein the usage information reporting configuration is used to configure reporting of usage information of a terminal, and the network apparatus is a 5G core network apparatus; and reporting, based on the usage information report configuration, usage information generated by direct communication with another terminal to the network device.

16 Claims, 14 Drawing Sheets

Receive a usage information reporting configuration sent by a network device — 21

Report, based on the usage information report configuration, usage information generated by direct communication with another terminal to the network device — 22

(51) Int. Cl.
*H04M 15/00* (2024.01)
*H04W 4/24* (2024.01)
*H04W 8/18* (2009.01)
*H04W 36/30* (2009.01)
*H04W 76/23* (2018.01)
*H04W 88/02* (2009.01)
*H04W 92/18* (2009.01)

(58) Field of Classification Search
USPC .......................................................... 455/405
See application file for complete search history.

(56) References Cited

U.S. PATENT DOCUMENTS

| | | | | |
|---|---|---|---|---|
| 2014/0329494 | A1* | 11/2014 | Zisimopoulos | H04M 15/66 455/406 |
| 2016/0261757 | A1 | 9/2016 | Rajadurai et al. | |
| 2018/0254542 | A1* | 9/2018 | Hu | H01Q 5/321 |
| 2018/0254842 | A1* | 9/2018 | Hua | H04W 52/243 |
| 2018/0324633 | A1 | 11/2018 | Lee et al. | |
| 2019/0174010 | A1 | 6/2019 | Rajadurai et al. | |
| 2019/0261199 | A1* | 8/2019 | Salkintzis | H04W 28/18 |
| 2020/0404466 | A1* | 12/2020 | Chiaverini | H04M 15/8061 |
| 2022/0060924 | A1 | 2/2022 | Kang et al. | |

FOREIGN PATENT DOCUMENTS

| | | |
|---|---|---|
| CN | 108347336 A | 7/2018 |
| CN | 111615143 A | 9/2020 |
| EP | 3968687 A1 | 3/2022 |
| WO | 2021026680 A1 | 2/2021 |

OTHER PUBLICATIONS

Second Office Action of the corresponding Chinese application No. 201980093850.1, issued on Aug. 24, 2023, 20 pages with English translation.

"Universal Mobile Telecommunications System (UMTS); Lte; Telecommunication management; Charging management; Proximity-based Services (ProSe) charging (3GPP TS 32.277 version 15.1.0 Release 15)", ETSI Technical Specification, European Telecommunications Standards Institute (ETSI), 650, Route Des Lucioles ; F-06921 Sophiaantipolis; France, vol. 3GPP SA, No. V15.1.0 Jun. 28, 2018 (Jun. 28, 2018), pp. 1-123, XP014330152, entire document.

Partial Supplementary European Search Report in the European application No. 19940986.3, mailed on May 18, 2022.

English translation of the Written Opinion of the International Search Authority in the International application No. PCT/CN2019/099956, mailed on Apr. 24, 2020.

First Office Action and search report of the corresponding Chinese application No. 201980093850.1, issued on Mar. 25, 2023, and its English Translation provided by Chinese Patent Office.

International Search Report in the international application No. PCT/CN2019/099956, mailed on Apr. 24, 2020.

3GPP."3rd Generation Partnership Project; Technical Specification Group Services and System Aspects;Policy and charging control architecture(Release 16)" 3GPP TS 23.203 VI6.1.0 (Jun. 2019), Jun. 30, 2019 (Jun. 30, 2019). main body, pp. 21-47, 69-77 and 91-92, all pages.

Written Opinion of the International Searching Authority in the international application No. PCT/CN2019/099956, mailed on Apr. 24, 2020, with English translation provided by Google Translate, all pages.

* cited by examiner

Receive processing-related information, and generate a processing rule based on the processing-related information — 41

FIG. 4

INFORMATION CONFIGURATION METHOD, NETWORK APPARATUS, AND TERMINAL

CROSS-REFERNCE TO RELATED APPLICATION

The present disclosure is a U.S. continuation application of International Application No. PCT/CN2019/099956, filed on Aug. 9, 2019. The disclosure of the International Application No. PCT/CN2019/099956 is incorporated herein by reference in its entirety.

BACKGROUND

With the development of the 5th Generation (5G) application, the Network Controlled Interactive Services (NCIS) service is introduced into the standard as a new service form for related standardized services. The NCIS service is mainly used for applications such as AR/VR and games, and has high requirements for service quality such as rate, delay, packet loss rate, and high-speed codec. The terminals in the NCIS group may have the following possible communication modes, which may be used in combination: if the terminals are close to each other, direct communication may be used, and if the terminals stay away from each other, communication is performed, for example, by using a network.

SUMMARY

The present disclosure relates to the technical field of information processing, and in particular to a method for configuring information, a network device, a terminal, a chip, a computer readable storage medium, a computer program product, and a computer program.

Embodiments of the present disclosure provide a method for configuring information, a network device, a terminal, a chip, a computer readable storage medium, a computer program product, and a computer program.

According to a first aspect, a method for configuring information is provided. The method is applicable by a terminal, and the terminal is capable of communicating in a 5G system. The method includes the following operations.

A usage information reporting configuration sent by the network device is received. The usage information reporting configuration is used for configuring report of usage information of the terminal. The network device is a 5th Generation (5G) core network device.

Usage information generated by direct communication with another terminal is reported to the network device based on the usage information reporting configuration.

According to a second aspect, a method for configuring information is provided. The method is applicable by a first network device in 5th Generation core network (5GC). The method includes the following operations.

A processing rule sent from a second network device is received.

A usage information reporting configuration is delivered for a terminal based on the processing rule.

The terminal is a terminal in a direct communication state with another terminal, and the usage information reporting configuration is used for configuring reporting of usage information of the terminal.

According to a third aspect, a method for configuring information is provided. The method is applicable by a second network device in a 5G core network (5GC). The method includes the following operations.

Processing-related information is received. A processing rule is generated based on the processing-related information. The processing-related information includes information of an application requiring data statistical processing and/or information of a terminal requiring data statistical processing.

According to a fourth aspect, a terminal is provided. The terminal is capable of communicating in a 5G system. The terminal includes a first communication unit.

The first communication unit is configured to: receive a usage information reporting configuration sent by a network device, The usage information reporting configuration being used for configuring report of usage information of the terminal, and the network device being a 5G core network device, and report, based on the usage information report configuration, usage information generated by direct communication with another terminal to the network device.

According to a fifth aspect, a first network device is provided. The first network device is a network device in a 5G core network (5GC). The first network device includes a second communication unit and a second processing unit.

The second communication unit is configured to receive a processing rule sent from a second network device.

The second processing unit is configured to deliver a usage information reporting configuration for the terminal through the second communication unit based on the processing rule;

The terminal is a terminal in a direct communication state with another terminal, and the usage information reporting configuration is used for configuring report of usage information of the terminal.

According to a sixth aspect, a second network device is provided. The second network device which is a network device in a 5G core network (5GC). The second network device includes a third communication unit and a third processing unit.

The third communication unit is configured to receive processing-related information.

The third processing unit is configured to generate a processing rule based on the processing-related information. The processing-related information includes information of an application requiring data statistical processing and/or information of a terminal requiring data statistical processing.

According to a seventh aspect, a terminal is provided. The terminal includes a processor and a memory. The memory is configured to store computer programs, and the processor is configured to invoke and execute the computer programs stored in the memory to perform the methods in the first aspect or the implementations thereof.

In an eighth aspect, a network device is provided. The network device includes a processor and a memory. The memory is configured to store the computer programs, and the processor is configured to invoke and execute the computer programs stored in the memory to perform the methods in the second, third, or various implementations thereof.

According to a ninth aspect, a chip is provided. The chip is used for implementing a method in the foregoing implementations.

Specifically, the chip includes a processor for invoking and executing computer programs from a memory to cause a device on which the chip is mounted perform a method of any one of the foregoing first to third aspects or various implementations thereof.

According to a tenth aspect, a computer-readable storage medium is provided. The computer-readable storage medium is used for storing computer programs. The computer programs cause a computer to perform any of the foregoing first to third aspects or the methods of the implementations thereof.

According to an eleventh aspect, a computer program product is provided. The computer program product includes computer program instructions that cause a computer to perform any of the foregoing first to third aspects or the methods of the implementations thereof.

According to a twelfth aspect, a computer program is provided. When the computer program run on a computer, a computer is caused to perform any one of the foregoing first to third aspects or the methods of the implementations thereof.

BRIEF DESCRIPTION OF THE DRAWINGS

FIG. 1-2 and FIG. 1-3 are schematic diagrams of two network architectures for charging.

FIG. 2 is a first flowchart of a method for configuring information according to the embodiments of the present disclosure.

FIG. 3 is a second flowchart of a method for configuring information according to the embodiments of the present disclosure FIG. 4 is a third flowchart of a method for configuring information according to the embodiments of the present disclosure.

DETAILED DESCRIPTION

In order to enable a more detailed understanding of the features and technical content of the embodiments of the present disclosure, the implementation of the embodiments of the present disclosure will be described in detail below with reference to the accompanying drawings, which are for illustration purposes only and are not intended to limit the embodiments of the present disclosure.

The technical solutions in the embodiments of the present disclosure will be described below with reference to the accompanying drawings in the embodiments of the present disclosure. It will be apparent that the described embodiments are some but not all of the embodiments of the present disclosure. Based on the embodiments of the present disclosure, all other embodiments obtained by those skilled in the art without creative effort fall within the scope of the present disclosure.

The technical solutions of the embodiments of the present disclosure may be applied to various communication systems, such as a Global System of Mobile Communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunications System (UMTS) system, a Worldwide Interoperability for Microwave Access (WiMAX) communication system, or a 5G system.

Figure 1:
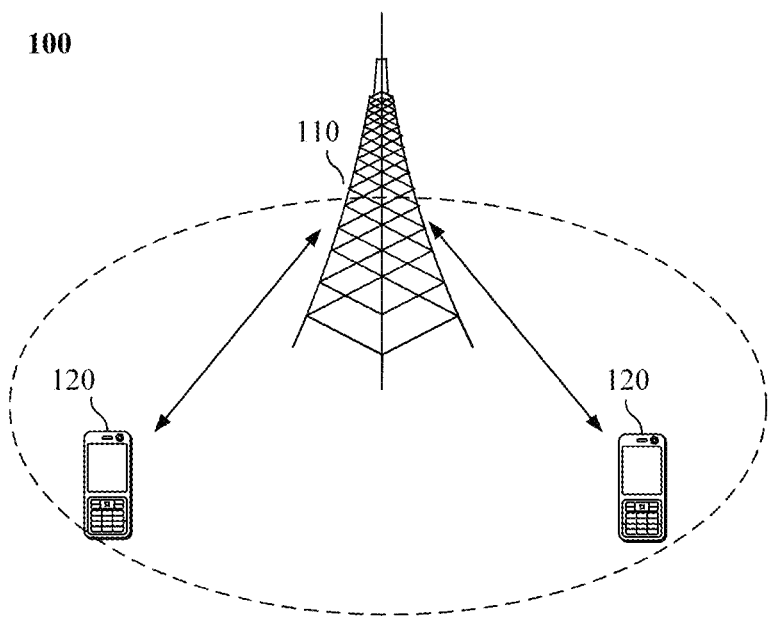
FIG. 1-1 is a first schematic diagram of a communication system architecture according to the embodiments of the present disclosure.

Exemplarily, the communication system 100 to which the present embodiment is applied may be shown in FIG. 1-1. The communication system 100 may include a network device 110, which may be a device that communicates with UE 120 (or referred to as communication terminal, terminal). The network device 110 may provide communication coverage for a particular geographic area and may communicate with UEs located within the coverage area. Alternatively, the network device 110 may be a network device (base transceiver station, BTS) in a GSM system or a CDMA system, may be a network device (NodeB, NB) in a WCDMA system, may be an evolved network device (Evolutional Node B, eNB or eNodeB) in an LTE system, or may be a radio controller in a Cloud Radio Access Network (CRAN), or may be a network side device in a mobile switching center, a relay station, an access point, a vehicle-mounted device, a wearable device, a hub, a switch, a bridge, a router, and a 5G network, or a network device in a future evolved Public Land Mobile Network (PLMN), or the like.

The communication system 100 further includes at least one UE 120 located within the coverage of the network device 110. The "UE" used herein includes, but is not limited to, the device connected via wired lines, such as via a Public Switched Telephone Networks (PSTN), a Digital Subscriber Line (DSL), a digital cable, a direct cable connection, and/or another data connection/network, and/or connected via a wireless interface, e.g., for a cellular network, a Wireless Local Area Network (WLAN), such as a digital television network based on a DVB-H network, a satellite network, an AM-FM broadcast transmitter, and/or device of another UE set to receive/send a communication signal, and/or an Internet of Things (IoT) device. A UE set to communicate through a wireless interface may be referred to as a "wireless communication terminal", "wireless terminal" or "mobile terminal".

Device to Device (D2D) communication may be performed between UEs 120 according to various embodiments of the present disclosure.

Figures 1, 2:
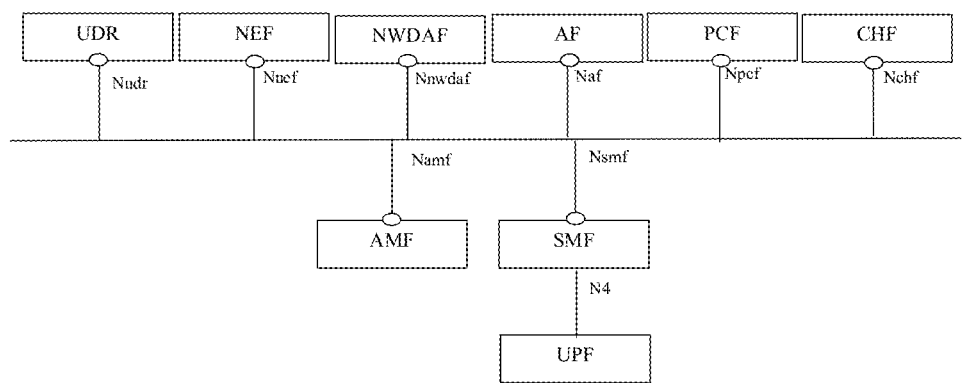
Figures 1, 2, 3:
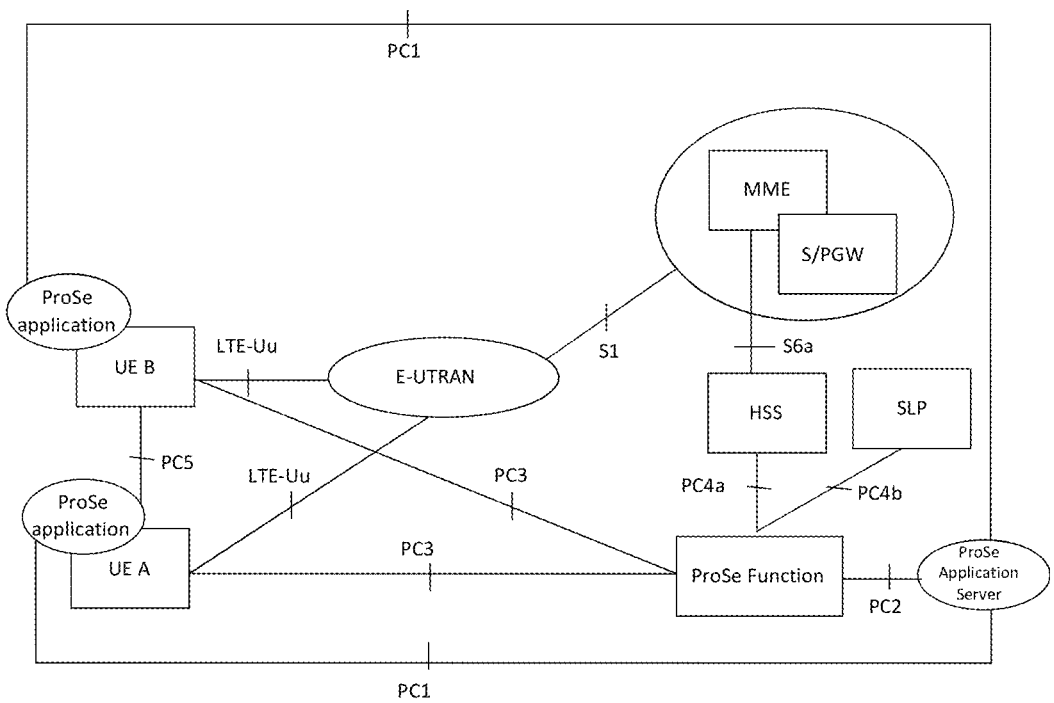
Figure 2:
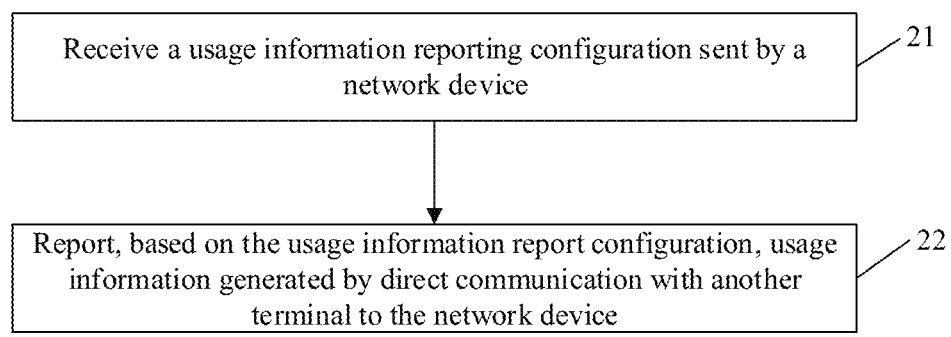
Figure 3:
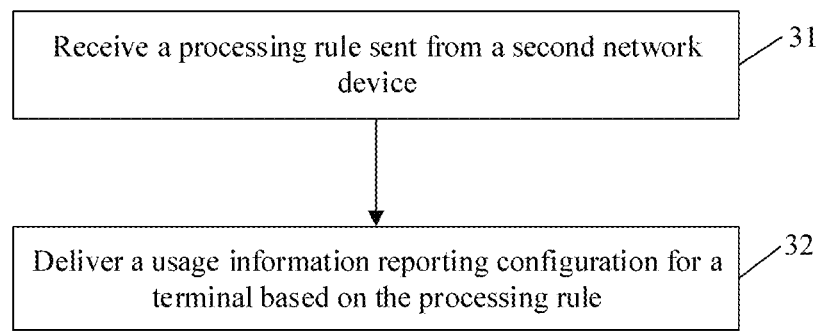

In the existing system, charging statistics may be performed by counting the data amount transmitted by user through network nodes. The specific network structure is shown in FIG. 1-2. The Communication(s) Handling Facilities (CHF) entity is a charging entity, and the Point Coordination Function (PCF) is a charging policy management entity. The PCF sends the charging policy to the (Session Management Function (SMF), and the SMF sends the policy to the UPF. The UPF is in charge of collecting actual data of the user and feeding back the data to the SMF. The SMF sends the charging information to CHF. In the LTE direct communication, a ProSe Function entity exists on the network side, as shown in FIG. 1-3. The function entity transfers the charging policy to the terminal through the PC3 interface, and the terminal reports related information to the ProSe function entity according to the charging policy.

It should be understood that the terms "system" and "network" used herein are often used interchangeably. In the present disclosure, the term "and/or" is only an association relationship describing the associated object, indicating that there may be three relationships. For example, A and/or B may mean that there are three relationships: A being exist alone, A and B being exist at the same time, and B being exist alone. In addition, the character "/" in the present disclosure generally means that the front and rear associated objects are an "or" relationship.

In the prior art, for the 5G system, there is no related technical solution for the record of the usage information in the process of performing live broadcast communication by an intra-group terminal.

By using the above technical solutions of the embodiments of the present disclosure, the usage information needed to be reported can be indicated for the terminal that performs the direct communication in the 5G system, so that the terminal can send the usage information generated by the direct communication according to the usage information reporting configuration. As a result, a manners of collecting usage information of terminals in direct communication in a 5G system is added, and charging processing can be performed on such terminals.

In order to understand the features and technical content of the embodiment of the present disclosure in more detail, the implementations of the embodiments of the present disclosure are described in detail below in combination with the attached drawings. The attached drawings are only for reference and description, and are not used to limit the embodiments of the present disclosure.

The embodiments of the present disclosure provide a method for configuring information. The method is applicable by a terminal. As shown in FIG. 2, the method includes the following operations.

In operation 21, a usage information reporting configuration sent by a network device is received. The usage information reporting configuration is used for configuring report of usage information of the terminal and the network device is a 5th Generation (5G) core network device.

In operation 22, usage information generated by direct communication with another terminal is reported to the network device based on the usage information reporting configuration.

Accordingly, the present embodiments provide a method for configuring information. The method is applicable by a first network device in a 5th Generation core network (5GC). As shown in FIG. 3, the method includes the following operations.

In operations 31, a processing rule sent from a second network device is received.

In operation 32, a usage information reporting configuration is delivered for a terminal based on the processing rule.

The terminal is a terminal in a direct communication state with another terminal and the usage information reporting configuration is used for configuring report of usage information of the terminal.

The present embodiments further provide a method for configuring information. The method is applicable by the second network device in the 5GC. As shown in FIG. 4, the method includes the following operations.

In operation 41, processing-related information is received and a processing rule is generated based on the processing-related information.

The processing-related information includes information of an application requiring data statistical processing and/or information of a terminal requiring data statistical processing.

The above first network device may be an SMF or an Authentication Management Function (AMF) in the 5GC network architecture, and the second network device may be a PCF in the 5GC architecture.

The present disclosure describes the solutions provided in the embodiments by using the following scenarios.

The First Scenario

Figure 5:
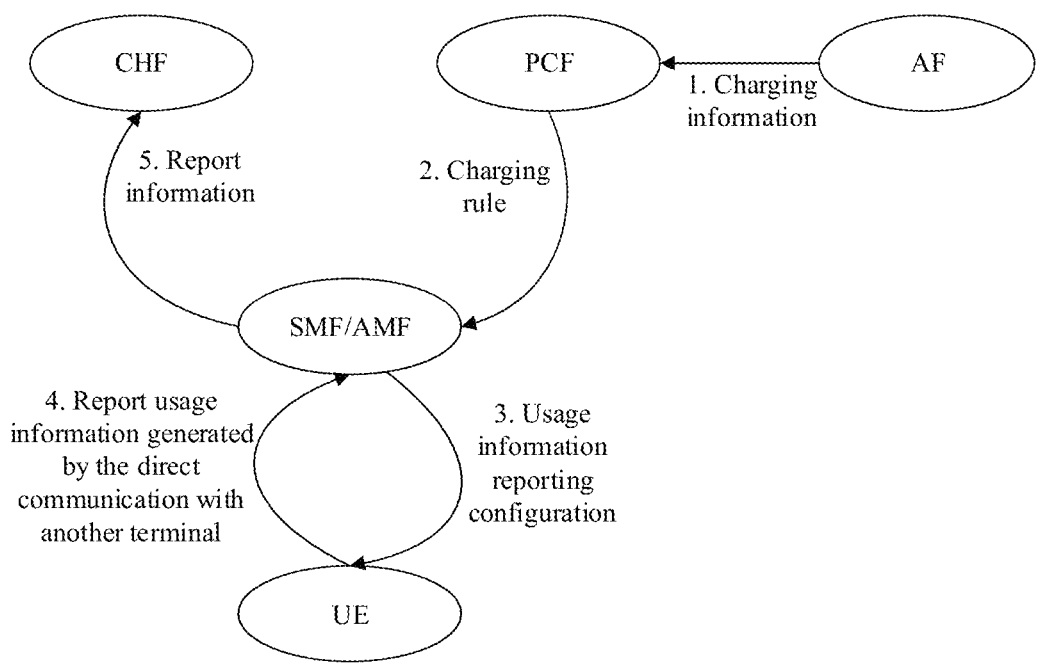
FIG. 5 and FIG. 6 are schematic diagrams of the processing architectures according to the embodiments of the present disclosure.

As shown in FIG. 5, a 5GC-related functional entity such as the second network device (PCF in the figures) obtains related charging information from an external application server (AF), then generates a related processing rule (i.e., a charging rule), generates a usage information reporting configuration of terminal by itself according to the charging rules, or sends the charging rule to the first network device (i.e., SMF), and the first network device generates a usage information reporting configuration of terminal according to the charging rule. Whether the first network device generates the usage information reporting configuration or the second network device generates the usage information reporting configuration, the first network device sends the usage information reporting configuration to the terminal.

Further, according to the usage information reporting configuration, the terminal generates corresponding reporting information on the PC 5 interface and sends the report information to the network device in the 5GC. For example, the terminal may send the reporting information to the first network device, and the first network device sends the reporting information to the CHF, which is the charging function entity.

The specific embodiment is as follow.

1. The processing-related information is sent to a second network device by an external application server, and the second network device generates a processing rule according to the processing-related information.

The processing-related information may be charging information. The processing-related information includes information of an application requiring data statistical processing and/or information of a terminal requiring data statistical processing.

Specifically, as shown in FIG. 5, the external application server is an AF, the second network device is a PCF, and the AF sends the charging information to the PCF. The charging information transferred therein may include application information such as an application identity, application group information such as identity of the application group, charged terminal information such as terminal identity information (GPSI).

Generating the processing rule according to the processing-related information may be understood as determining an application group identity and/or an application identity in the processing rule according to information of the application requiring data statistical processing. The corresponding identity of a terminal that needs to report the usage information is further specified according to whether the terminals requiring statistical processing corresponding to different applications are the transmitting-side terminals and/or the receiving-side terminals. In addition, when generating the processing rule, since the solution provided in the present disclosure corresponds to the scenario of communicating in the direct link, the link to which the processing rule is adapted may be specified, for example, the link is specifically specified as the direct link. Further, the corresponding access network type, that is, the corresponding RAT is determined. Specifically, the access network type may be NR or EUTRAN.

In one embodiment, the external application server sends the charging information to the charging policy generating entity in the 5GC, that is, the second network device, e.g., the PCF entity. Alternatively, in another embodiment, the charging information is transferred to the PCF entity through the Network Element Function (NEF) entity.

2. The second network device sends the processing rule to the first network device.

Specifically, the second network device may select a corresponding first network device, and then send the processing rule to the first network device.

The operation that the corresponding first network device is selected may include the following operation.

A first network device corresponding to the application is selected.

Alternatively, a first network device corresponding to the terminal is selected.

That is, when the processing rule includes application information (for example, an application identity or an application group identity), the first network device corresponding to the application may be selected according to the application information. When the processing rule includes the terminal information (such as the terminal group identity or the terminal identity), the first network device corresponding to the terminal may be selected according to the terminal information.

It should be noted that the first network device may correspond to one or more applications, or one or more terminals.

Further, in the application information selection, in response to an application identity being included, a first network device corresponding to the application identity is selected. In response to an application group identity being included, one or more first network devices corresponding to the application group may be selected. The terminal selection is the same process and will not be described again.

In this case, there may also be a processing mode in which the second network device generates the usage information reporting configuration, and then sends both the processing rule and the usage information reporting configuration to the first network device. Alternatively, the second network device may directly send the processing rule to the first network device, and then the first network device generates the usage information reporting configuration according to the processing rule.

The usage information reporting configuration includes at least one of the following: application group information, application identity, usage information collection period, reporting period, reporting event, and content included in the reported usage information. The application group information and the application identity may be obtained directly according to the processing rules, and the usage information collection period may be determined according to the actual situation, for example, may be determined according to the type of the application, the current network communication situation, and the like. For example, in response to the application being a low-delay service, the usage information collection period may be set to be shorter, and otherwise, the usage information collection period may be set to be longer. Alternatively, the current network condition is relatively good, and it may be considered that the current interactive information may be more, so that the usage information collection period may be set to be shorter, and otherwise, the usage information collection period may be set to be longer. The reporting period may be set according to an actual situation, and similarly, the low-delay service may require a relatively long reporting period, thereby avoiding a waste of communication resources by the terminal. Alternatively, the reporting period may be set to be relatively short, thereby obtaining usage information of such a service as soon as possible. The reported event is used to trigger the terminal to report.

The reported usage information includes at least one of the following: location information, time information, configured radio parameter information, application group information corresponding to reported usage information, application information corresponding to reported usage information, data amount information transmitted by the terminal, data amount information received by the terminal, data amount sent or received by the terminal for a specific service/application, and applicable Public Land Mobile Network (PLMN) information.

The content included in the determined reporting usage information is set according to the actual situation and the processing rule, for example, the terminal is instructed to report the application group information or the application identity information included in the processing rule. Further, it is indicated that the terminal needs to report the data amount information sent and/or received by the terminal. Alternatively, only the data amount sent or received for some of the specified services or applications may be reported.

The reporting event includes reporting when the data amount received by the terminal reaches a first threshold, and/or reporting when the amount of data sent by the terminal reaches a second threshold value.

The first threshold value and the second threshold value may be set according to an actual situation, which is not limited herein.

Exemplarily, as shown in FIG. 5, taking the second network device being a PCF entity, the first network device being an SMF entity, and the processing related information being charging information as an example, the PCF entity selects an applicable SMF entity according to the received charging information, and configures a charging rule for the SMF. Further, the PCF may select the applicable SMF entity in the following manner.

The PCF selects the applicable SMF according to the application information and/or the group information in the charging information received in step 1, for example, the SMF supporting the session of the application and/or the group service.

The PCF selects the applicable SMF, that is, the SMF serving the terminal, according to the charged terminal information therein.

An example of charging rule and usage information reporting configuration may be as following table 1.

TABLE 1

| | |
|---|---|
| Group information. | Group identity |
| Charging object/information reporting object | Transmitting-side UE, or receiving-side UE or both. |
| Service identity, Application identity | The service identity or application identity, or group identity, or QoS Flow identity or type that are applicable for the charging rule. |
| Charged terminal | Terminal identity |
| Applicable link | Terminal direct link |
| Applicable RAT | NR and/or EUTRAN |

TABLE 1-continued

| Usage information reporting configuration | Usage Information Collection Period<br>The content included in the reported usage information includes: location information, time information, configured radio parameter information, group information, application information, data amount information transmitted by the terminal, data amount information received by the terminal, data amount sent or received by the terminal for a specin response to ic service/application, and applicable Public Land Mobile Network (PLMN) Information reporting period<br>Reporting event, for example, reporting after the data amount sent by the terminal reaches the preconfigured threshold value, and reporting after the data amount received by the terminal reaches the preconfigured threshold. |
|---|---|

3. The first network device sends the usage information reporting configuration to the terminal. For example, as shown in FIG. 5, the SMF sends the usage information reporting configuration to the UE.

4. The usage information reporting configuration sent by the network device is received. The usage information reporting configuration is used for configuring report of usage information of a terminal. The network device is a 5G core network device. Based on the usage information reporting configuration, the usage information generated by the direct communication with other terminal is reported to the network device, and the terminal collects and reports the usage information according to the usage information control configuration after receiving the configuration message. The usage information carries the reported content information of the network configuration.

Further, the operation that the terminal receives the usage information reporting configuration may be receiving the usage information reporting configuration information at the Non-access stratum (NAS), transferring the configuration information to the direct communication layer, and collecting data by the direct communication layer.

The terminal then collects the usage information, and reports the usage information generated by the direct communication with other terminal to the first network device. As shown in FIG. 5, the UE reports usage information generated by direct communication with other terminal to the SMF.

5. The usage information reported by the terminal and the identity of the terminal are sent to the fourth network device. The fourth network device is used for performing statistical processing for the terminal based on the usage information.

Exemplarily, as shown in FIG. 5, the SMF reports received terminal usage information and terminal identity information, collected link information, and RAT information to the CHF.

The Second Scenario

The present scenario is different from the first scenario in that in the present scenario, the processing rule is generated by the second network device based on the processing-related information. A usage information reporting configuration is generated based on the processing rule, and the usage information reporting configuration is sent to the first network device. The usage information reporting configuration is used for configuring report of usage information of the terminal.

Then, the usage information reporting configuration is sent to the first network device. Then, the first network device sends the usage information reporting configuration to the terminal. The terminal reports usage information to the first network device.

In this scenario, the usage information reported by the terminal may be sent by the second network device to the fourth network device, or the usage information reported by the terminal may be directly sent by the first network device to the fourth network device.

Figure 6:
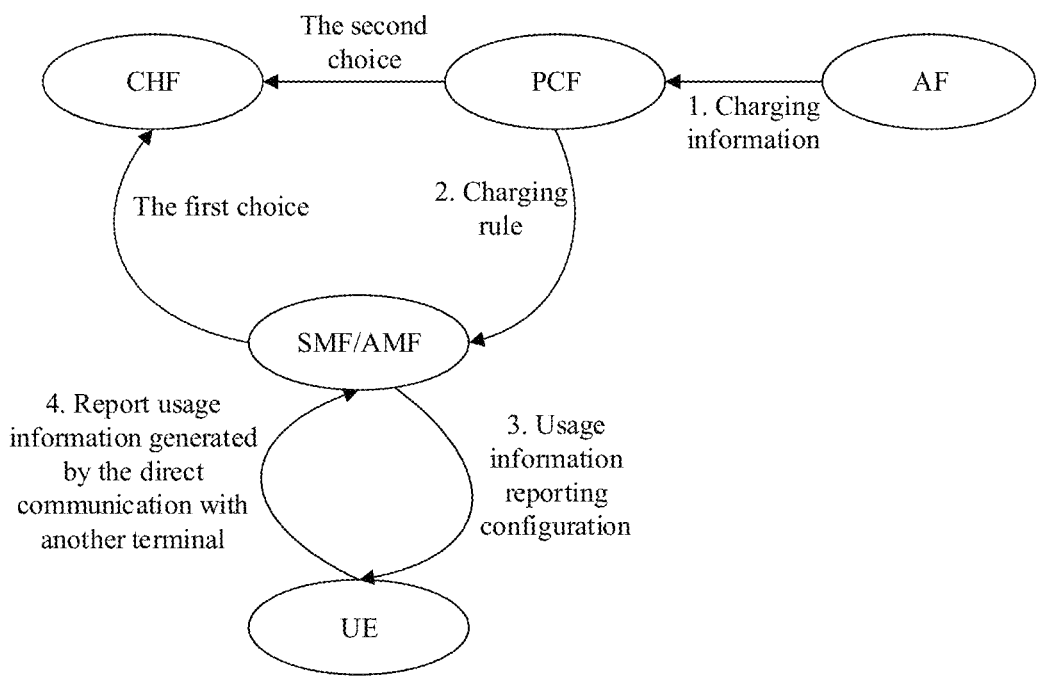

For example, referring to FIG. 6, the PCF may directly deliver the generated usage configuration information to the terminal via the NAS message of the AMF. The charging rule is as shown in the first embodiment. The terminal collects and reports data according to the configuration information of the PCF.

The Third Scenario

The present scenario may be used in combination with the first scenario and/or the second scenario. That is, on the basis of first scenario and/or the second scenario, the first network device or the second network device may determine whether to send the usage information reported by the terminal to the fourth network device. Alternatively, whether to send the usage information to the first network device may be determined by the terminal.

The external application server or the NEF entity may carry application provider information in processing-related information, and send the application provider information to the second network device. That is, the external application server sends the charging information to the charging policy generating entity in the 5GC, for example, the PCF entity. Alternatively, the information may be transferred to a second network device, such as a PCF entity, via the NEF entity. The charging information transferred therein may include application information, such as an application identity, group information, such as a group identity, and application provider information.

In a processing manner, the second network device determines whether to send the usage information reported by the terminal and the identity of the terminal to the fourth network device according to the application provider information corresponding to the application information included in the usage information reported by the terminal.

That is, the corresponding application provider is determined according to the application information included in the usage information reported by the terminal. If the policy reserved by the application provider on the network side is that the terminal does not need to be charged, the second network device may not report the usage information of the terminal to the fourth network device.

In another processing manner, whether to send the usage information reported by the terminal and the identity of the terminal to the fourth network device may be determined by the first network device according to the application provider information corresponding to the application information included in the usage information reported by the terminal. The specific processing manner may be the same as that of the second network device. The application provider information is provided by a second network device or by an application server.

In a processing manner, the usage information reporting configuration may further include: an application identity or application group information instructing the terminal not to report, or application provider information.

That is, whether to report the usage information is determined by the terminal device. For example, after the terminal device detects the data amount sent or received by the application/terminal, whether the corresponding application identity is the application identity or the application group information indicating not to report in the usage information reporting configuration is determined. If yes, the usage information for this type of applications may not be reported. Alternatively, whether to report the usage information of the applications may be determined according to the application provider information and the application identity corresponding to the data amount detected by itself.

Alternatively, when the first network device or the second network device sends the usage information reported by the terminal to the fourth network device, the application provider information may be carried. Thus, whether to perform the charging processing on the usage information reported by the terminal is determined by the fourth network device.

Taking the first network device being the SMF or the AMF, the second network device being the PCF, and the fourth network device being the CHF as an example, in the first scenario and/or the second scenario, the SMF or the PCF does not feed back to the CHF according to the usage information provided by all terminals associated with a specific group or a specific application and according to the information provided by the AF, or feeds back to the CHF and provides the information of the charged application provider simultaneously.

In the fourth scenario, the present scenario mainly describes in detail with respect to the processing on the terminal side in the above various scenarios.

After receiving the usage information reporting configuration of the network configuration, the terminal collects data according to the configuration information therein.

The terminal may collect usage information generated through at least one application with the other terminal based on the usage information collection period in the usage information reporting configuration.

Specifically, the at least one application is at least one of the following.

In response to the usage information reporting configuration including the application group information, the at least one application is at least one application included in an application group indicated by the application group information. That is, the terminal collects usage information generated by all applications included in the application group information.

In response to the usage information reporting configuration including an application identity, the at least one application is an application corresponding to the application identity. That is, the usage information may be collected according to the application identity included in the usage information reporting configuration.

In response to the usage information reporting configuration not including application group information and the application identity, the at least one application is one or more applications for which the terminal communicates directly with the other terminal. That is, the usage information generated through various applications in the direct communication is collected.

Further, after the information is collected, whether usage information of the at least one application collected in the reporting period satisfies the reporting event may be determined according to the reporting event and the reporting period included in the usage information reporting configuration. In response to the reporting event being satisfied, usage information generated by direct communication with other terminal is reported to the network device.

For example, the usage information collected in the reporting period is reported in response to the reporting event being satisfied. Otherwise, in response to the reporting event being not satisfied, report may not be performed.

Alternatively, whether the usage information of the at least one application collected by the terminal satisfies the reporting event is determined. In response to the reporting event being satisfied, the usage information generated by direct communication with other terminal is reported to the network device.

That is, whether to report the usage information is determined only according to whether the collected usage information satisfies the reporting event.

Alternatively, the usage information of the at least one application collected in the reporting period may be reported according to the reporting period included in the reporting configuration of the usage information. In this case, only the reporting period is configured in the usage information reporting configuration, and report may be performed in each reporting period. In this case, report may be performed as long as the reporting period is reached without considering the data amount of the usage information.

For example, the usage information reporting configuration may be shown in the following Table 2.

TABLE 2

| | |
|---|---|
| Group information. | Group ID = 1 |
| Charging object/information reporting object | Transmitting-side UE |
| Service identity, application identity | Application ID = 1 |
| Charged Terminal | SUPI |
| Applicable link | Terminal direct link |
| Applicable RAT | NR |
| Usage information reporting control configuration | Usage information collection period: 1 min<br>Content included in the reported usage information: data amount information transmitted by the terminal, and applicable PLMN information<br>Reporting period: 5 min<br>A reporting event: the sent data amount exceeds 2M. |

The terminal collects data on the direct link for the application 1 in the group 1, and reports the corresponding data information to the network every 5 minutes. The data information carries the sent data amount and information about whether the sent object belongs to a same PLMN, and if not, the peer PLMN information is carried.

When the application or group does not included in the charging rule, it represents collecting the usage information for all the groups and applications. The terminal may report the related content for each group and each application respectively, or report the entire content.

In the fifth scenario, for the above various scenarios, a manner of reporting usage information by the terminal is described as follows.

The terminal reports the usage information in the following two manners.

1) The usage information generated by the direct communication with the other terminal is carried through a NAS message, and the NAS message is sent to the network device.

That is, the usage information reported by the terminal is carried in a NAS message and is sent to the PCF or the SMF according to the configuration source. Further, after the direct communication layer of the terminal collects the corresponding usage information and the usage information reporting process is triggered, the quality communication layer of the terminal transferred the data to the NAS layer and encapsulates the data as an NAS PDU, which is respectively sent to SMF or PCF according to the configuration source.

2) The usage information generated by the direct communication with other terminal is carried by the user plane data, and the user plane data is sent to the network device.

That is, the user plane data is used for carrying. The terminal sends usage information to the user plane protocol layer of the access layer, such as the PDCP layer, and indicates corresponding information. At the same time, information corresponding to the data is indicated on the N3 interface, and after receiving the data, the UPF determines to send the data to the SMF according to the corresponding information. Alternatively, the terminal encapsulates the usage information into an IP data packet using a preconfigured IP source address or destination address or port number, and after receiving the data, the UPF determines to send the data to the SMF according to the IP header information. Alternatively, a new layer is added between the terminal and the UPF for transferring usage information, and the UPF sends the received data on the new layer to the SMF.

It can be seen that by adopting the above-described solutions, the usage information needed to be reported may be indicated for the terminal performing the direct communication in the 5G system, so that the terminal may send the usage information generated by the direct communication according to the usage information reporting configuration. As a result, collection manners of the usage information of terminal in direct communication in a 5G system are added, and charging processing may be performed on such terminals.

Figure 7:
FIG. 7 is a schematic structural diagram of a terminal according to the embodiments of the present disclosure.
Figure 8:
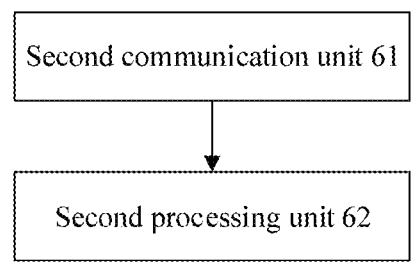
FIG. 8 is a first schematic structural diagram of a network device according to the embodiments of the present disclosure.
Figure 9:
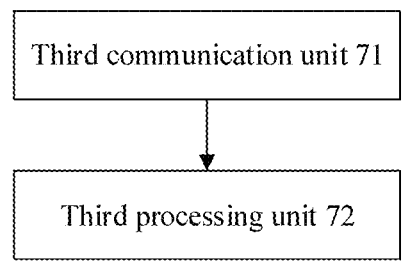
FIG. 9 is a second schematic structural diagram of a network device according to the embodiments of the present disclosure.

The embodiments of the present invention provide a terminal. As shown in FIG. 7, the terminal includes a first communication unit.

The first communication unit 51 is configured to receive a usage information reporting configuration sent by a network device, the usage information reporting configuration being used for configuring a report of usage information of the terminal and the network device being a 5G core network device, and report, based on the usage information reporting configuration, usage information generated by direct communication with another terminal to the network device.

Accordingly, the embodiments provide a first network device. The first network device is a network device in 5GC. The first network device includes a second communication unit and a second processing unit.

The second communication unit 61 is configured to receive a processing rule sent from a second network device.

The second processing unit 62 is configured to deliver a usage information reporting configuration for the terminal through the second communication unit based on the processing rule.

The terminal is a terminal in a direct communication state with another terminal and the usage information reporting configuration is used for configuring report of usage information of the terminal.

The embodiments further provide a second network device. The second network device is a network device in 5GC. The second network device includes a third communication unit and a third processing unit.

The third communication unit 71 is configured to receive processing-related information.

The third processing unit 72 is configured to generate a processing rule based on the processing-related information. The processing-related information includes information of an application requiring data statistical processing and/or information of a terminal requiring data statistical processing.

The above first network device may be an SMF or an AMF in the 5GC network architecture, and the second network device may be a PCF in the 5GC architecture.

The present disclosure describes the solutions provided in the embodiments by using the following scenarios.

The First Scenario

As shown in FIG. 5, a 5GC-related functional entity such as the second network device (PCF in the figures) obtains related charging information from an external application server (AF), then, generates a related processing rule (i.e., a charging rule), generates a usage information reporting configuration of terminal by itself according to the charging rules, or sends the charging rule to the first network device (i.e., SMF), and the first network device generates a usage information reporting configuration of terminal according to the charging rule. Whether the first network device generates the usage information reporting configuration or the second network device generates the usage information reporting configuration, the first network device sends the usage information reporting configuration to the terminal.

Further, according to the usage information reporting configuration, the terminal generates corresponding reporting information on the PC 5 interface and sends the report information to the network device in the 5GC. For example, the terminal may send the reporting information to the first network device, and the first network device sends the reporting information to the CHF, which is the charging function entity.

The specific embodiment is as follow.

1. The processing-related information is sent to the third communication unit of the second network device by an external application server, and the third processing unit of the second network device generates a processing rule according to the processing-related information.

The processing-related information may be charging information. The processing-related information includes information of an application requiring data statistical processing and/or information of a terminal requiring data statistical processing.

2. The third communication unit of the second network device sends the processing rule to the first network device.

Specifically, the third processing unit of the second network device may select the corresponding first network device, and then sends the processing rule to the first network device through the third communication unit.

The operation that the corresponding first network device is selected may include the following operation.

A first network device corresponding to the application is selected.

Alternatively, a first network device corresponding to the terminal is selected.

The usage information reporting configuration includes at least one of the following: application group information, application identity, usage information collection period, reporting period, reporting event, and content included in the reported usage information. The application group information and the application identity may be obtained directly according to the processing rules, and the usage information collection period may be determined according to the actual situation, for example, may be determined according to the type of the application, the current network communication situation, and the like. For example, in response to the application being a low-delay service, the usage information collection period may be set to be shorter, and otherwise, the usage information collection period may be set to be longer. Alternatively, the current network condition is relatively good, and it may be considered that the current interactive information may be more, so that the usage information collection period may be set to be shorter, and otherwise, the usage information collection period may be set to be longer. The reporting period may be set according to an actual situation, and similarly, the low-delay service may require a relatively long reporting period, thereby avoiding a waste of communication resources by the terminal. Alternatively, the reporting period may be set to be relatively short, thereby obtaining usage information of such a service as soon as possible. The reported event is used to trigger the terminal to report.

The reported usage information includes at least one of the following: location information, time information, configured radio parameter information, application group information corresponding to reported usage information, application information corresponding to reported usage information, data amount information transmitted by the terminal, data amount information received by the terminal, data amount sent or received by the terminal for a specific service/application, and applicable Public Land Mobile Network (PLMN) information.

The content included in the determined reporting usage information is set according to the actual situation and the processing rule, for example, the terminal is instructed to report the application group information or the application identity information included in the processing rule. Further, it is indicated that the terminal needs to report the data amount information sent and/or received by the terminal. Alternatively, only the data amount sent or received for some of the specified services or applications may be reported.

The reporting event includes reporting when the data amount received by the terminal reaches a first threshold, and/or reporting when the amount of data sent by the terminal reaches a second threshold value.

The first threshold value and the second threshold value may be set according to an actual situation, which is not limited herein.

3. The second communication unit of the first network device sends the usage information reporting configuration to the terminal. For example, as shown in FIG. 5, the SMF sends the usage information reporting configuration to the UE.

4. The first communication unit of the terminal receives the usage information reporting configuration sent by the network device. The usage information reporting configuration is used for configuring report of usage information of a terminal, and the network device is a 5G core network device. Based on the usage information reporting configuration, the usage information generated by the direct communication with other terminal is reported to the network device, and the terminal collects and reports the usage information according to the usage information control configuration after receiving the configuration message. The usage information carries the reported content information of the network configuration.

Further, the operation that the terminal receives the usage information reporting configuration may be receiving the usage information reporting configuration information at the Non-access stratum (NAS), transferring the configuration information to the direct communication layer, and collecting data by the direct communication layer.

The terminal further includes a first processing unit 52. The first processing unit 52 is configured to collect usage information, and then reports usage information generated by direct communication with the other terminal to the first network device through the first communication unit 51. As shown in FIG. 5, the UE reports usage information generated by direct communication with the other terminal to the SMF. 5. The second communication unit of the first network device sends the usage information reported by the terminal and the identity of the terminal to the fourth network device.

The fourth network device is used for performing statistical processing for the terminal based on the usage information.

Exemplarily, as shown in FIG. 5, the SMF reports received terminal usage information and terminal identity information, collected link information, and RAT information to the CHF.

The Second Scenario

The present scenario is different from the first scenario in that in the present scenario, the processing rule is generated by the third processing unit of the second network device based on the processing-related information. A usage information reporting configuration is generated based on the processing rule, and the usage information reporting configuration is sent to the first network device through the third communication unit. The usage information reporting configuration is used for configuring report of usage information of the terminal.

After sending the usage information reporting configuration to the first network device, the second communication unit of the first network device then sends the usage information reporting configuration to the terminal. The terminal reports usage information to the first network device.

In this scenario, the usage information reported by the terminal may be sent by the second network device to the fourth network device, or the usage information reported by the terminal may be directly sent by the first network device to the fourth network device.

The Third Scenario

The present scenario may be used in combination with the first scenario and/or the second scenario. That is, on the basis of first scenario and/or the second scenario, the first network device or the second network device may determine whether to send the usage information reported by the terminal to the fourth network device. Alternatively, whether to send the usage information to the first network device may be determined by the terminal.

The external application server or the NEF entity may carry application provider information in processing-related information, and send the application provider information to the second network device. That is, the external application server sends the charging information to the charging policy generating entity in the 5GC, for example, the PCF entity. Alternatively, the information may be transferred to a second network device, such as a PCF entity, via the NEF entity. The charging information transferred therein may include application information, such as an application identity; group information, such as a group identity, and application provider information.

In a processing manner, the third processing unit of the second network device determines whether to send the usage information reported by the terminal and the identity of the terminal to the fourth network device according to the application provider information corresponding to the application information included in the usage information reported by the terminal.

In another processing manner, whether to send the usage information reported by the terminal and the identity of the terminal to the fourth network device may be determined by the second processing unit of the first network device according to the application provider information corresponding to the application information included in the usage information reported by the terminal. The specific processing manner may be the same as that of the second network device. The application provider information is provided by a second network device or by an application server.

In a processing manner, the usage information reporting configuration may further include: an application identity or application group information instructing the terminal not to report, or application provider information.

That is, whether to report the usage information is determined by the terminal device. For example, after the terminal device detects the data amount sent or received by the application/terminal, whether the corresponding application identity is the application identity or the application group information indicating not to report, in the usage information reporting configuration is determined. If yes, the usage information for this type of applications may not be reported. Alternatively, whether to report the usage information of the applications may be determined according to the application provider information and the application identity corresponding to the data amount detected by itself.

Alternatively, when the first network device or the second network device sends the usage information reported by the terminal to the fourth network device, the application provider information may be carried. Thus, whether to perform the charging processing on the usage information reported by the terminal is determined by the fourth network device.

In the fourth scenario, the present scenario mainly describes in detail with respect to the processing on the terminal side in the above various scenarios.

After the terminal receives the usage information reporting configuration of the network configuration, the first processing unit collects data according to the configuration information therein.

The first processing unit of the terminal may collect usage information generated through at least one application with the other terminal based on the usage information collection period in the usage information reporting configuration.

Specifically, the at least one application is at least one of the following.

In response to the usage information reporting configuration including application group information, the at least one application is at least one application included in an application group indicated by the application group information. That is, the terminal collects usage information generated by all applications included in the application group information.

In response to the usage information reporting configuration including an application identity, the at least one application is an application corresponding to the application identity. That is, the usage information may be collected according to the application identity included in the usage information reporting configuration.

In response to the usage information reporting configuration not including application group information and the application identity, the at least one application is one or more applications for which the terminal communicates directly with the other terminal. That is, the usage information generated through various applications in the direct communication is collected.

Further, after the first processing unit of the terminal collects the information, whether usage information of the at least one application collected in the reporting period satisfies the reporting event may be determined according to the reporting event and the reporting period included in the usage information reporting configuration. In response to the reporting event being satisfied, usage information generated by direct communication with other terminal is reported to the network device.

Alternatively, whether the usage information of the at least one application collected by the terminal satisfies the reporting event is determined by the first processing unit of the terminal. In response to the reporting event being satisfied, the usage information generated by direct communication with other terminal is reported to the network device.

Alternatively, the usage information of the at least one application collected in the reporting period may be reported by the first processing unit of the terminal according to the reporting period included in the reporting configuration of the usage information. In this case, only the reporting period is configured in the usage information reporting configuration, and report may be performed in each reporting period. In this case, report may be performed as long as the reporting period is reached without considering the data amount of the usage information.

In the fifth scenario, for the above various scenarios, a manner of reporting usage information by the terminal is described as follows.

The first communication unit of the terminal reports the usage information in the following two manners.

1) The usage information generated by the direct communication with the other terminal is carried through a NAS message, and the NAS message is sent to the network device.

2) The usage information generated by the direct communication with other terminal is carried by the user plane data, and the user plane data is sent to the network device.

It can be seen that by adopting the above-described solutions, the usage information needed to be reported may be indicated for the terminal performing the direct communication in the 5G system, so that the terminal may send the usage information generated by the direct communication according to the usage information reporting configuration. As a result, collection manners of the usage information of terminal in direct communication in a 5G system are added, and charging processing may be performed on such terminals.

Figure 10:
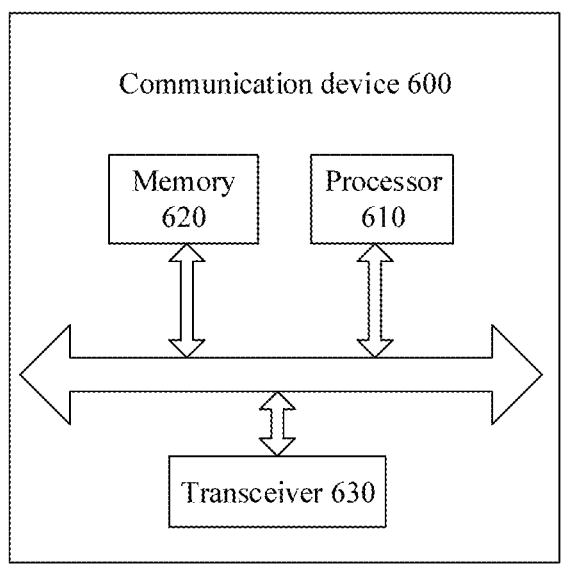
FIG. 10 is a schematic structural diagram of a communication device according to the embodiments of the present disclosure.

FIG. 10 is a schematic structural diagram of a communication device 600 according to the embodiments of the present disclosure. The communication device in the embodiments may be specifically a network device or a terminal device in the foregoing embodiments. The communication device 600 shown in FIG. 10 includes a processor 610. The processor 610 may invoke and execute computer programs from memory to implement the method of the embodiments of the present disclosure.

Optionally, as shown in FIG. 10, the communication device 600 may further include a memory 620. The processor 610 may invoke and execute the computer programs from the memory 620 to implement the method of the embodiments of the present disclosure.

The memory 620 may be a separate device independent of the processor 610, or may be integrated into the processor 610.

Alternatively, as shown in FIG. 10, the communication device 600 may further include a transceiver 630. The transceiver 630 may be controlled by the processor 610 to communicate with other devices, in particular to send information or data to or receive information or data sent by other devices.

The transceiver 630 may include a transmitter and a receiver. The transceiver 630 may further include an antenna, and the number of antennas may be one or more.

Alternatively, the communication device 600 may be specifically the network device of the embodiments of the present disclosure, and the communication device 600 may implement the corresponding flows implemented by the network device in the methods of the embodiments of the present disclosure. For brevity, details are not described herein.

Alternatively, the communication device 600 may be specifically a terminal device or a network device of the embodiments of the present disclosure, and the communication device 600 may implement corresponding flows implemented by a mobile terminal/terminal device in various methods of the embodiments of the present disclosure. For brevity, details are not described herein.

Figure 11:
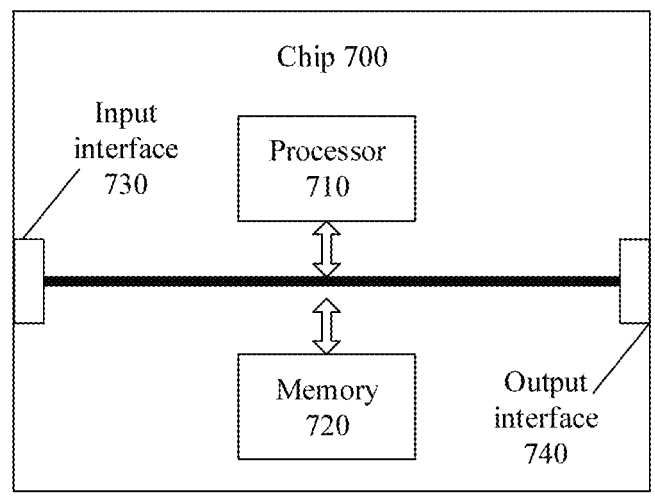
FIG. 11 is a schematic block diagram of a chip according to the embodiments of the present disclosure.

FIG. 11 is a schematic structural diagram of a chip according to the embodiments of the present disclosure. The chip 700 shown in FIG. 11 includes a processor 710. The processor 710 may invoke and execute the computer programs from memory to implement the method of the embodiments of the present disclosure.

Alternatively, as shown in FIG. 11, the chip 700 may further include a memory 720. The processor 710 may invoke and execute the computer programs from the memory 720 to implement the method of the embodiments of the present disclosure.

The memory 720 may be a separate device independent of the processor 710, or may be integrated into the processor 710.

Alternatively, the chip 700 may further include an input interface 730. The processor 710 may control the input interface 730 to communicate with other devices or chips, and in particular may acquire information or data sent by the other devices or chips.

Alternatively, the chip 700 may further include an output interface 740. The processor 710 may control the output interface 740 to communicate with other devices or chips, and in particular may output information or data to other devices or chips.

Alternatively, the chip may be applied to the network device in the embodiments of the present disclosure, and the chip may implement the corresponding flows implemented by the terminal device in various methods in the embodiments of the present disclosure. For brevity, details are not described herein.

It should be understood that the chip mentioned in the embodiments of the present disclosure may also be referred to as a system-on-a-chip, a system chip, a chip system, or a system-on-a-chip.

It should be understood that the processor of an embodiments of the present disclosure may be an integrated circuit chip having signal processing capability. In implementation, the steps of the above method embodiments may be accomplished by integrated logic circuitry of hardware in the processor or instructions in the form of software. The processor may be a general purpose processor, a Digital Signal Processor (DSP), an Application Specific Integrated Circuit (ASIC), a Field Programmable Gate Array (FPGA) or other programmable logic device, a discrete gate or transistor logic device, or a discrete hardware component. The methods, steps, and logical block diagrams disclosed in the embodiments of the present disclosure may be implemented or performed. The general purpose processor may be a microprocessor or the processor may be any conventional processor or the like. The steps of the method disclosed in connection with the embodiments of the present disclosure may be directly performed by a hardware decoding processor, or performed by a combination of hardware and software modules in the decoding processor. The software module may be located in a storage medium mature in the art, such as a random access memory, a flash memory, a read-only memory, a programmable read-only memory, or an electrically erasable programmable memory, a register, or the like. The storage medium is located in the memory, and the processor reads the information in the memory and completes the steps of the method in combination with the hardware.

It should be understood that the memory in embodiments of the present disclosure may be volatile memory or non-volatile memory, or may include both volatile and non-volatile memory. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM) that functions as an external cache. By way of example, but not limitation, many forms of RAM may be used, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It should be noted that the memories of the systems and methods described herein are intended to include, but are not limited to, these and any other suitable types of memories.

It should be understood that the above-described memory is exemplary but not limiting. For example, the memory in the embodiments of the present disclosure may also be a static RAM (SRAM), a dynamic RAM (DRAM), a synchronous DRAM (SDRAM), a double data rate SDRAM (DDR SDRAM), an enhanced SDRAM, (ESDRAM), a synch link DRAM (SLDRAM), a Direct Rambus RAM (DR RAM), or the like. That is, memories in embodiments of the present disclosure are intended to include, but are not limited to, these and any other suitable types of memories.

Figure 12:
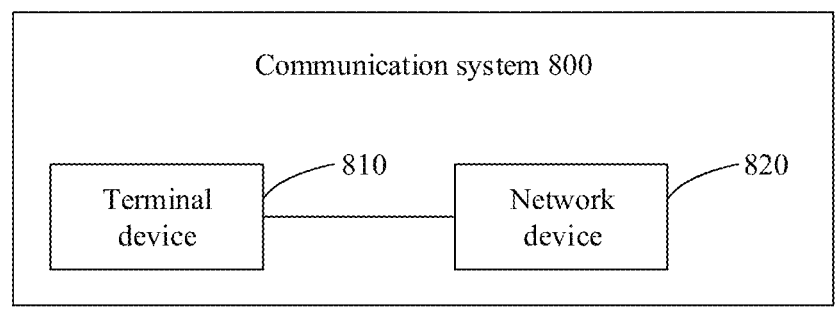
FIG. 12 is a second schematic diagram of a communication system architecture according to the embodiments of the present disclosure.

FIG. 12 is a schematic block diagram of a communication system 800 according to embodiments of the present disclosure. As shown, the communication system 800 includes a terminal device 810 and a network device 820.

The terminal device 810 may be configured to implement corresponding functions implemented by the UE in the method described above, and the network device 820 may be configured to implement corresponding functions implemented by the network device in the method described above. For brevity, details are not described herein.

Embodiments of the present disclosure further provide a computer-readable storage medium for storing a computer program.

Alternatively, the computer-readable storage medium may be applicable by the network device or the terminal device in the embodiments of the present disclosure, and the computer programs cause the computer to execute the corresponding flows implemented by the network device in the methods in the embodiments of the present disclosure. For brevity, details are not described herein.

Embodiments of the present disclosure also provide a computer program product comprising computer program instructions.

Alternatively, the computer program product may be applicable by the network device or the terminal device in the embodiments of the present disclosure, and the computer program instructions cause the computer to execute the corresponding flows implemented by the network device in the methods in the embodiments of the present disclosure. For brevity, details are not described herein.

Embodiments of the present invention also provide a computer program.

Alternatively, the computer program may be applicable by the network device or the terminal device in the embodiments of the present disclosure. When the computer program runs on a computer, the computer executes the corresponding flows implemented by the network device in the methods in the embodiments of the present disclosure. For brevity, details are not described herein.

Those of ordinary skill in the art should understood that the units and algorithm steps of the examples described in connection with the embodiments disclosed herein can be implemented in electronic hardware, or a combination of computer software and electronic hardware. Whether these functions are performed in hardware or software depends on the particular application and design constraints of the technical solutions. A person skilled in the art may implement the described functions using different methods for each particular application, but such implementation should not be considered beyond the scope of the present disclosure.

Those skilled in the art will clearly understand that for convenience and brevity of the description, reference may be made to the corresponding process in the foregoing method embodiments for the detailed working process of the system, apparatus and unit described above.

In the several embodiments provided by the present disclosure, it should be understood that the disclosed systems, apparatus and methods may be implemented in other ways. For example, the apparatus embodiments described above are merely illustrative. For example, the unit partitioning is merely a logical function partitioning, and may be implemented in other ways, such as multiple units or components may be combined or integrated into another system, or some features may be ignored or not performed. Alternatively, the shown or discussed coupling or direct coupling or communication connection to one another may be via some interface, indirect coupling or communication connection to a device or unit, may be in electrical, mechanical or other form.

The units described as separate units may or may not be physically separate, and the units displayed as units may or may not be physical units, i.e. may be located in one place, or may be distributed over a plurality of network units. Some or all of the units may be selected according to actual needs to achieve the purpose of the present embodiment solutions.

In addition, the functional units in the various embodiments of the present disclosure may be integrated in one processing unit, or each unit may be physically present alone, or two or more units may be integrated in one unit.

The functions may be stored in a computer-readable storage medium if they are implemented as software functional units and sold or used as stand-alone products. Based on such an understanding, the technical solutions of the present disclosure essentially or part of the contribution to the prior art or part of the technical solutions may be implemented in the form of a software product stored in a storage medium comprising instructions for causing a computer device (which may be a personal computer, server, or network device, etc.) to perform all or part of the steps of the methods described in the various embodiments of the present disclosure. The foregoing storage medium includes a USB flash drive, a removable hard disk, a Read-Only Memory (ROM), a Random Access Memory (RAM), a magnetic disk, an optical disks, and other media that can store program codes.

The foregoing descriptions are merely the specific embodiments of the present disclosure, but the protection scope of the present disclosure is not limited thereto. Any change or replacement readily contemplated by those skilled in the art within the technical scope disclosed by the present disclosure shall fall within the protection scope of the present disclosure. Therefore, the protection scope of the present disclosure should be subject to the protection scope of the claims.

The invention claimed is:

1. A method for configuring information, applicable by a terminal, comprising:
   receiving a usage information reporting configuration sent by a network device, wherein the usage information reporting configuration is used for configuring a report of usage information of the terminal, and the network device is a 5th Generation (5G) core network device; and
   reporting, based on the usage information report configuration, usage information generated by direct communication with another terminal to the network device,
   wherein the usage information reporting configuration comprises application group information, application identity, usage information collection period, reporting period, reporting event, and content comprised in the reported usage information, wherein the content comprised in the reported usage information comprises location information, time information, configured radio parameter information, application group information corresponding to the reported usage information, application information corresponding to the reported usage information, information of data amount transmitted by the terminal, information of data amount received by the terminal, data amount sent or received by the terminal for a specific service or application, and applicable Public Land Mobile Network (PLMN) information, wherein the reporting event comprises reporting when the data amount received by the terminal reaches a first threshold, and reporting when the amount of data sent by the terminal reaches a second threshold value.

2. The method of claim 1, wherein the network device is a second network device, and receiving the usage information reporting configuration sent by the network device comprises:
   receiving the usage information reporting configuration sent by the second network device through a third network device,
   wherein the usage information reporting configuration is generated by the second network device according to a processing rule.

3. The method of claim 1, wherein reporting, based on the usage information reporting configuration, the usage information generated by direct communication with the other terminal to the network device comprises:
   reporting, according to the reporting period comprised in the usage information reporting configuration, usage information of at least one application collected in the reporting period.

4. The method of claim 1, wherein the reporting, based on the usage information reporting configuration, the usage information generated by direct communication with the other terminal to the network device comprises:
   determining whether usage information of at least one application collected by the terminal satisfies the reporting event; and
   in response to the reporting event being satisfied, reporting the usage information generated by direct communication with the other terminal to the network device.

5. The method of claim 1, wherein reporting the usage information generated by direct communication with the other terminal to the network device comprises:

sending a Non-access stratum (NAS) message to the network device, by carrying through the NAS message, the usage information generated by the direct communication with the other terminal; or sending user plane data to the network device, by carrying through the user plane data, the usage information generated by the direct communication with the other terminal.

6. A terminal, comprising a processor and a memory for storing computer programs capable of running on the processor, wherein the memory is configured to store the computer programs, and the processor is configured to invoke and execute the computer programs stored in the memory to perform operations of:

receiving a usage information reporting configuration sent by a network device, wherein the usage information reporting configuration is used for configuring a report of usage information of the terminal and the network device is a 5G core network device; and reporting, based on the usage information report configuration, usage information generated by direct communication with another terminal to the network device, wherein the usage information reporting configuration comprises application group information, application identity, usage information collection period, reporting period, reporting event, and content comprised in the reported usage information, wherein the content comprised in the reported usage information comprises location information, time information, configured radio parameter information, application group information corresponding to the reported usage information, application information corresponding to the reported usage information, information of data amount transmitted by the terminal, information of data amount received by the terminal, data amount sent or received by the terminal for a specific service or application, and applicable Public Land Mobile Network (PLMN) information, wherein the reporting event comprises reporting when the data amount received by the terminal reaches a first threshold, and reporting when the amount of data sent by the terminal reaches a second threshold value.

7. The terminal of claim 6, wherein the usage information reporting configuration is generated by the first network device based on a processing rule sent by a second network device.

8. The terminal of claim 6, wherein the operations further comprises:

collecting, based on the usage information collection period in the usage information reporting configuration, usage information generated through at least one application during direct communication with the other terminal.

9. The terminal of claim 6, wherein reporting, based on the usage information report configuration, the usage information generated by direct communication with the other terminal further comprises:

determining, according to the reporting event and the reporting period comprised in the usage information reporting configuration, whether usage information of at least one application collected in the reporting period satisfies the reporting event; and in response to the reporting event being satisfied, report the usage information generated by direct communication with the other terminal to the network device.

10. The terminal of claim 7, wherein the usage information reporting configuration further comprises:

an application identity or application group information instructing that the terminal not to report; or application provider information.

11. A first network device, the first network device being a network device in 5G core network (5GC), comprising a processor and a memory for storing computer programs capable of running on the processor, wherein the memory is configured to store the computer programs, and the processor is configured to invoke and execute the computer programs stored in the memory to perform operations:

receiving a processing rule sent from a second network device; and a delivering a usage information reporting configuration for the terminal through the second communication unit based on the processing rule, wherein the terminal is a terminal in a direct communication state with another terminal and the usage information reporting configuration is used for configuring report of usage information of the terminal, wherein the usage information reporting configuration comprises application group information, application identity, usage information collection period, reporting period, reporting event, and content comprised in the reported usage information, wherein the content comprised in the reported usage information comprises location information, time information, configured radio parameter information, application group information corresponding to the reported usage information, application information corresponding to the reported usage information, information of data amount transmitted by the terminal, information of data amount received by the terminal, data amount sent or received by the terminal for a specific service or application, and applicable Public Land Mobile Network (PLMN) information, wherein the reporting event comprises reporting when the data amount received by the terminal reaches a first threshold, and reporting when the amount of data sent by the terminal reaches a second threshold value.

12. The first network device of claim 11, wherein delivering the usage information reporting configuration for the terminal comprises:

deliver the usage information reporting configuration for the terminal on a Non-access stratum (NAS).

13. The first network device of claim 12, wherein the usage information reporting configuration further comprises:

an application identity or application group information instructing the terminal not to report; or application provider information.

14. The first network device of claim 13, wherein the operations further comprises:

sending usage information reported by the terminal and an identity of the terminal to a fourth network device, wherein the fourth network device is configured to perform statistical processing for the terminal based on the usage information; or sending the usage information reported by the terminal and the identity of the terminal to the fourth network device through the second network device.

15. The first network device of claim 13, wherein the operations further comprises:

determining, according to application provider information corresponding to application information comprised in usage information reported by the terminal, whether to send the usage information reported by the terminal and an identity of the terminal to a fourth network device.

16. The first network device of claim 15, wherein the application provider information is provided by the second network device or by an application server.

* * * * *